United States Patent [19]

Bennetch

[11] 4,086,174

[45] Apr. 25, 1978

[54] COBALT MODIFIED ACICULAR γ FERRIC OXIDE AND PROCESS FOR PREPARING THE SAME

[75] Inventor: Leonard N. Bennetch, Bethlehem, Pa.

[73] Assignee: Pfizer Inc., New York, N.Y.

[21] Appl. No.: 815,076

[22] Filed: Jul. 12, 1977

Related U.S. Application Data

[63] Continuation of Ser. No. 648,670, Jan. 13, 1976, abandoned, which is a continuation of Ser. No. 467,459, May 6, 1974, abandoned.

[51] Int. Cl.$^2$ .................... C01G 49/06; G11B 5/70
[52] U.S. Cl. ................... 252/62.56; 252/62.55; 427/128; 428/483; 428/539
[58] Field of Search ............ 252/62.55, 62.56; 423/633, 634; 427/128; 428/483, 539

[56] References Cited

U.S. PATENT DOCUMENTS

| | | | |
|---|---|---|---|
| 3,015,627 | 1/1962 | Ayers et al. | 252/62.56 X |
| 3,075,919 | 1/1963 | Gruber et al. | 252/62.56 X |
| 3,382,174 | 5/1968 | Hund | 252/62.56 X |
| 3,498,748 | 3/1970 | Greiner | 252/62.56 X |
| 3,573,980 | 4/1971 | Haller et al. | 252/62.56 X |
| 3,652,334 | 3/1972 | Abeck et al. | 252/62.56 X |
| 3,720,618 | 3/1973 | Toda et al. | 252/62.56 |
| 3,897,354 | 7/1975 | Woditsch et al. | 252/62.56 |

OTHER PUBLICATIONS

Inatsu et al., "J. Inst. T.V. Engrs. of Japan", vol. 26, No. 5 (1972) pp. 369–374.

*Primary Examiner*—Jack Cooper
*Attorney, Agent, or Firm*—Connolly and Hutz

[57] ABSTRACT

A novel cobalt modified synthetic acicular γ ferric oxide is disclosed which when incorporated with a recording binder provides a recording member which exhibits a magnetic stability coefficient of from about 4000 to about 10,000. A novel process for production of said oxide is also disclosed.

8 Claims, 1 Drawing Figure

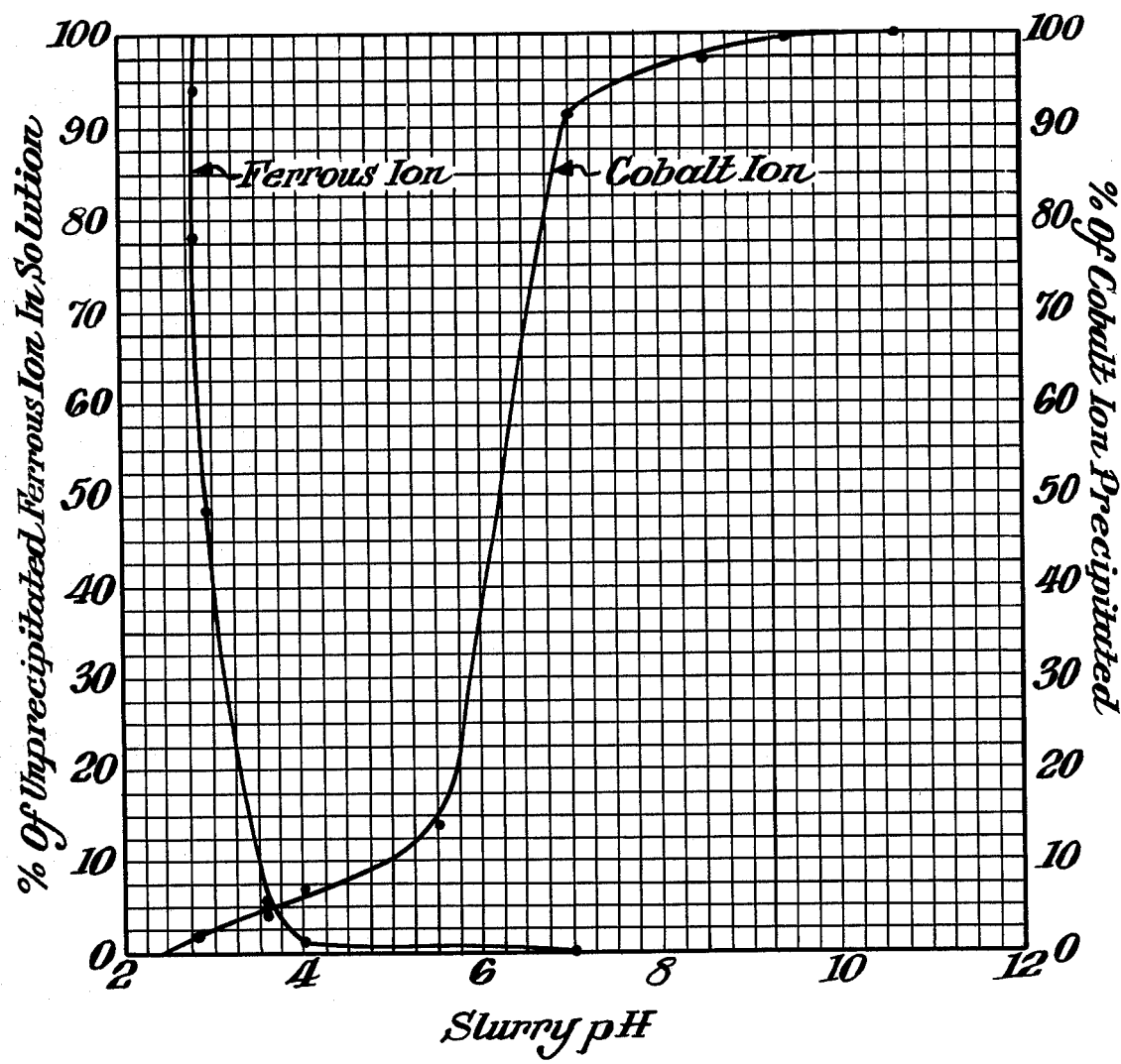

COBALT MODIFIED ACICULAR γ FERRIC OXIDE AND PROCESS FOR PREPARING THE SAME

CROSS REFERENCE TO RELATED APPLICATIONS

This application is a continuation of application Ser. No. 648,670 filed Jan. 13, 1976 now abandoned which is a continuation of application Ser. No. 467,459 filed May 6, 1974 now abandoned.

BACKGROUND OF THE INVENTION

The present invention deals with the field of magnetic iron oxides useful in the tape recording industry. It presents a novel cobalt modified acicular gamma ferric oxide and a novel process for its production, both of which are superior to any such products or processes previously known in the field. Many suggestions in the prior art, for example, Gruber et al. (U.S. Pat. No. 3,075,919), relate to the synthesis of cobalt modified acicular $\gamma$-$Fe_2O_3$ by alleged co-precipitation of a cobalt containing ferrous hydroxide from an alkali and soluble ferrous and cobaltous salt which is then oxidized to cobalt modified ferric hydroxide. The precipitate is washed, dried and converted to cobalt containing $\gamma$-$Fe_2O_3$ by heating and then reducing to $Fe_3O_4$ and subsequently oxidizing to cobalt containing $\gamma$-$Fe_2O_3$. When the alkali is added to the soluble ferrous and cobaltous salt, coprecipitation does not occur. As the pH increases, the ferrous ions are precipitated and then the cobalt ions. The presence of the cobalt salts tends to destroy the acicularity of the initial seed resulting in a cobalt modified $\gamma$-$Fe_2O_3$ which is difficult to orient and results in inferior recording properties when incorporated into magnetic tape.

Some prior art proposals refer to precipitation methods which take place at high pH, Toda et al. (U.S. Pat. No. 3,720,618). These methods produce cobalt modified $\gamma$-$Fe_2O_3$ which itself has a high pH. It will be understood by one skilled in the art that the pH of a solid is determined from pH measurements of an aqueous suspension thereof using a glass electrode. The high pH of the cobalt modified $\gamma$-$Fe_2O_3$ is a disadvantage in that these particles are then incompatible with the organic formulation which is used to incorporate the particles into a magnetic recording tape. This is especially true for polyurethane type formulations. Another prior art suggestion (Abeck et al., U.S. Pat. No. 3,117,933) employs a pH which is not taken sufficiently high to completely precipitate all the cobalt ions.

There is much concern in the literature (Haller et al., U.S. Pat. No. 3,725,126) over the stability of cobalt modified $\gamma$-$Fe_2O_3$ particles in that if information is recorded on them and they are heated to elevated temperatures, a certain loss occurs which is greater than for conventional low coercive force $\gamma$-$Fe_2O_3$ particles. Some attempts have been made to reduce this instability (Haller, et al., U.S. Pat. No. 3,725,126).

SUMMARY OF THE INVENTION

The present invention is intended to overcome the previously stated difficulties. One aspect of the present invention comprises synthetic acicular gamma ferric oxide containing at least about ¼ atomic percent cobalt based on the iron content, which when incorporated with recording binder at a level of 75% by weight of total formulation provides a magnetic recording member which exhibits a magnetic stability coefficient of from about 4000 to about 10,000. The precursor to the cobalt modified gamma ferric oxide is prepared by a two-step process in order to prevent the cobalt ions from modifying the critical acicular nature of the colloidal seed slurry of lepidocrocite ($\gamma$-FeOOH). The product is especially preferred which contains from 2 to 5 atomic percent cobalt, based on the iron content.

A second aspect of the present invention comprises a process for the manufacture of said acicular gamma ferric oxide comprising the steps of:

(a) introducing aqueous alkali into aqueous ferrous chloride containing from about 0.25 to 0.7 pound ferrous chloride per gallon, said alkali being added at the rate of from about 0.03 to 0.2 equivalents per minute per mole dissolved ferrous chloride while maintaining the temperature at about 60°–90° F.; continuing said addition until sufficient alkali has been added to precipitate from about 20 to 85% of the iron ion;

(b) introducing oxygen-containing gas into said aqueous mixture until the pH is between about 2.6 and 4.1;

(c) adding water-soluble cobalt salt to the resulting lepidocrocite seed slurry in an amount equivalent to at least about 0.25 atomic percent cobalt based on the total iron introduced;

(d) maintaining said slurry at about 80°–160° F. and a pH between about 2.6 and 4.1 while simultaneously and continuously introducing alkali and oxygen-containing gas until the iron content is substantially completely precipitated in the form of lepidocrocite;

(e) adding aqueous alkali in the presence of oxygen-containing gas at about 80°–160° F. to a pH between about 7 and 9.5 until substantially all of the cobalt ion has precipitated on the surface of said lepidocrocite; and (f) reducing said cobalt modified lepidocrocite to cobalt modified ferroso-ferric oxide at a temperature of from about 650° to 800° F., and subsequently oxidizing to cobalt modified acicular gamma ferric oxide.

The process is especially preferred wherein the cobalt modified lepidocrocite produced in step "E" is coated with at least one hydrophobic aliphatic monocaboxylic acid having from about 8 to about 24 carbon atoms prior to the reduction and oxidation of step "F", and also wherein the final product is mechanically densified.

The process is also preferred wherein said alkali is selected from sodium hydroxide, potassium hydroxide or calcium hydroxide; wherein said cobalt salt is added in an amount equivalent to from about 2 to 5 atomic percent cobalt based on the total iron content; and said oxidation is performed in a current of air.

The oxide and process of the present invention result in numerous advantages in the field of magnetic recordings. For example, when the known process using excessively alkaline conditions is compared with the present invention, we note that we produce an oxide with a pH of 6 rather than an alkaline oxide. Furthermore, when the present invention is incorporated into a magnetic recording tape, the tape itself exhibits must improved recording characteristics and mush improved remanence retention in the recorded direction after exposure to elevated temperatures. With the present invention we obtain a magnetic stability coefficient of greater than 4000 compared with less than 2200 for the prior art. The stability coefficient is defined as the product of (1) the coercive force (Hc) in oersteds parallel to particle alignment, (2) the ratio of loss of saturated remanence perpendicular to particle alignment to the loss parallel to alignment after 30 minutes at 150° C. and (3) the squareness ratio. The squareness ratio is the ratio of squareness, Br/Bm, where Br is saturation remanence retention and Bm is saturation magnetization of the magnetic recording tape measured in the direction of particle alignment to its squareness measured perpendicular thereto. The maximum applied field is 5,000 Oc in all cases.

In the accompanying drawing,

The FIGURE is a graph which illustrates the percent of unprecipitated ferrous ion and precipitated cobalt ion as a function of slurry pH in the process of the invention.

DETAILED DESCRIPTION OF THE INVENTION

The present novel process comprises a method of making synthetic anicular cobalt modified gamma ferric oxide. This oxide is characterized by having very fine-grained, needle-like crystalline particles, with an average length to width ratio of 6.7:1 and with the majority ranging from 4:1 up to 10:1 and a length up to 2 microns. This is accomplished by first making synthetic lepidocrocite colloidal seed slurry which comprises:

(a) combining ferrous chloride with aqueous alkali, said ferrous chloride concentration being about 0.25-0.70 pounds per gallon; and (b) vigorously agitating the mixture of (a) while maintaining the temperatures at from about 60° to 90° F. and introducing an oxygen-containing gas until the mixture pH is about 2.6-4.1.

Preferably said aqueous alkali is selected from the group consisting of NaOH, KOH and Ca(OH)$_2$, but numerous other bases such as sodium carbonate, magnesium carbonate and sodium bicarbonate and other alkali and alkaline earth metal carbonates and hydroxides and mixtures thereof may be used. Such bases are meant whenever alkali or aqueous alkali are referred to in this application. Air is preferred as the oxygen-containing gas.

An appropriate quantity of cobalt ions in the form of a soluble salt such as cobaltous chloride is then added to the slurry. Other cobalt salts which may be used with similar results include cobaltous nitrate, cobaltous sulphate or other water soluble cobalt salts. The amount of cobalt used is determined by the cobalt concentration desired in the final product, with from about ¾ to 10 atomic percent based on the iron content usually being preferred. Of course, higher and lower concentrations are possible if special requirements are to be met.

The slurry is then maintained under a condition of vigorous agitation at a temperature of about 80°-160° F. and a pH of about 2.6-4.1 while simultaneously and continuously introducing alkali and an oxygen-containing gas until the pH is between about 7 and 9.5 and about 1.2-5.0 parts by weight of total product is formed per part by weight of said seed.

At the end of the seed forming step the temperature has generally risen above 80° F. and with an initial concentration of 0.25-0.70 pounds of ferrous chloride per gallon there is sufficient excess ferrous chloride present which is needed during the generation step to allow the desired cobalt modified synthetic lepidocrocite product to form which usually takes about 5-50 hours. Close control of temperature and pH conditions are necessary to obtain the desired product. Temperatures outside the preferred temperature range of 80°-160° F. result in an undesirable product. In order to completely precipitate all the cobalt ions the pH is increased to about 9.5 with excess alkali. It is to be noted that air rates and reaction times depend primarily on reactor design. However, vigorous agitation is necessary during the formation of the lepidocrocite seed slurry and product to result in the desirable cobalt modified lepidocrocite particle characteristics. The vigorous agitation of the slurry ensures maximum uniformity of particle size and morphology. This can be conveniently accomplished by machanical stirring and the action of bubbling the oxygen-containing gas through the mixture; however, this does not exclude other means (familiar to anyone skilled in the art) of accomplishing the same result.

Synthetic acicular cobalt modified magnetic gamma ferric oxide is produced from the synthetic cobalt modified lepidocrocite previously described. Length to width ratios averaging 6.7:1 and the majority ranging between 4:1 and 10:1 are obtained in the magnetic cobalt modified ferric oxide particles which are characterized similarly to the lepidocrocite particles as very fine-grained, needle-like crystalline particles, having a length up to about 2 microns.

The improved magnetic properties obtained are directly attributable to the greatly improved characteristics of the cobalt modified lepidocrocite. The synthetic cobalt modified magnetic gamma ferric oxide is produced from the synthetic cobalt modified lepidocrocite by reducing the latter with hydrogen, for example, to ferroso-ferric oxide at high temperature conditions (typically 650°-800° F.), the oxidizing in a current of air (typically at about 450°-720° F.), and then mechanically densifying the product if desired (typically in a ball mill, roller mill, or muller-mixer machine, etc.) to improve its recording characteristics. The densification step is provided to decrease the degree of agglomeration of particles which may result during processing, while maintaining the same particle size (i.e. there is substantially no particle degradation during densification).

A preferred method of making the cobalt modified magnetic ferric oxide from cobalt modified lepidocrocite is to apply a coating of an organic surface treating agent to the lepidocrocite particles before reducing and oxidizing. The coating is essentially a monomolecular layer on the particles, consisting of at least one hydrophobic aliphatic monocarboxylic acid, having 8-24 carbon atoms. This coating tends to keep the particles from agglomerating during processing by neutralizing surface-active forces and results in superior magnetic orientation characteristics in the final product. Also the use of such a fatty acid coating obviates the need for hydrogen during processing, due to the inherent reducing action of the surface treating agent. The coating can be accomplished in many ways with many different monocarboxylic acids as disclosed in Greiner, U.S. Pat. No. 3,498,748. Preferably, about 1.6-10% of coconut oil fatty acid or lauric acid is used (alone or as a mixture), rendered water-soluble or dispersible by addition of about 0.15-1.5% morpholine, percentages based on the weight of cobalt modified lepidocrocite in the mixture.

The use of the synthetic cobalt modified magnetic gamma ferric oxide described above in magnetic impulse record members results in superior performance characteristics in these members, especially in recording tapes. Magnetic tapes containing the cobalt modified gamma ferric oxide were prepared from a laboratory vinyl copolymer formula using a 75% by weight loading of magnetic material. The mixture was ball-milled for 48 hours yielding a product having a viscosity of approximately 85 krebs units. The formulation is then applied in accordance with known practice to a polyethylene terephthalate base in the form of a 3 inch strip. While the applied coating is still wet, it is run through a magnetic field to orient the particles in known manner after which the strip is dried and may be calendered, compressed or burnished and finally it is slit and put on rolls or reels under tension, the normal coating thicknesses being from about 0.10 to 0.60 mil, and in this specific instance, being about 0.40 mil.

Magnetic tapes made with the cobalt modified gamma ferric oxide described previously exhibit Br/Bm ratios as high as 0.85 in a magnetizing field of 5 kOe. This squareness ratio as it is more commonly called is an indication of the degree of particle orientation in the tape. The higher the squareness, the more remanent flux is available for recording signals for the same level of magnetic particle loading in the formulation. when compared with other commercially available cobalt modified $\gamma$-$Fe_2O_3$ particles in the same identical formula we observe Br values as high as 1370 gauss for a magnetic tape utilizing the particle described previously compared with 830 gauss for commercially available powders. This considerable increase in Br results in much improved recording characteristics such as signal to noise ratio, saturated outputs, undistored output and sensitivity at all frequencies (see Example VII).

The examples to follow are illustrative and in no way limit the scope of the claims.

EXAMPLE I

A. Preparation of Lepidocrocite Seed

To an 8700 gallon tank equipped with a mechanical stirrer and a perforated pipe air sparger was added 4572 gallons of water containing 2541 lbs. of ferrous chloride and 0.66 gallons of conc. HCl. While vigorously stirring, over a 16 minute period, 1302 gallons of solution containing 0.553 lbs/gal. of HaOH were pumped in. While still stirring air was admitted at the rate of 50 cfm (standard cubic feet per minute). In 90 minutes the ferrous precipitate was oxidized to the ferric form. The temperature of the solution was held at 75°-83° F. The final pH was 3.1.

B. Preparation of Cobalt Modified Lepidocrocite

In order to obtain 3.18% by weight cobalt doping level (relative to iron content) 40-50 gallons of solution containing 150.1 lbs. of $CoCl_2.6H_2O$ was added to the completed seed. The solution was agitated and air was admitted at the rate of 49-50 cfm through the sparger. NaOh (concentration 0.553 lbs/gal) was added at 3.4-4.7 gal/min. The tank solution was heated up to 143° F. and maintained at 135°-143° F. throughout the run. The pH was maintained at 2.7-3.2. When all the ferrous ions had been precipitated and oxidized continuing the addition of NaOH increased the pH. The pH was allowed to rise to 10.8. The resultant 1892 lbs. of cobalt modified lepidocrocite represents a total product to seed ratio of about 2.3 to 1.

C. Preparation of Cobalt Modified Gamma Ferric Oxide

The surface of the cobalt modified lepidocrocite particles was treated at 130° F. while stirring by adding a surface treating agent mix of about 500 gallons of solution at 170° F. containing 78.8 lbs. of coconut oil fatty acid and 7.9 lbs. of morpholine. The treated slurry was then maintained at 150° F. while stirring for 1 hour. The resulting product coated with 5% fatty acid surface treating agent (on an $Fe_2O_3$ weight basis) was filtered, washed and dried.

This material was reduced in a batch type furnace at 800° F. in the coconut oil fatty acid reducing atmosphere to cobalt modified ferroso-ferric oxide and subsequently oxidized in a current of air at 700° F. to cobalt modified gamma ferric oxide whose magnetic properties were enhanced by mechanically densifying for 390 minutes. The finished cobalt modified gamma ferric oxide tested in a 1000 hZ hysteresis loop tracer at 1900 Oe showed an Hc of 475 Oe, Br 2139 gauss, Bm 3809 gauss.

The finished product was then incorporated into magnetic tape (see Example VII).

EXAMPLE II

A. Preparation of Lepidocrocite Seed

In the same manner as described in Example I, a seed slurry was prepared from ferrous chloride and NaOH. Final seed pH was 2.6 190 Gallons of said seed was placed in a 250 gallon tank equipped with a mechanical stirrer and an air sparger.

B. Preparation of Cobalt Modified Lepidocrocite

In order to obtain 4.64% by weight cobalt doping level (relative to iron content) 1 gallon of solution containing 6.93 lbs. of $CoCl_2.6H_2O$ was added to the completed seed. The solution was agitated and air admitted at the rate of 2.0 cfm through the sparger. NaOH (concentration 0.533 lbs./gal) was added at 7-10 gal/hr. The tank solution was heated up to 140° F. and maintained at 135°-145° F. throughout the run. The pH was maintained at 2.8-3.2. When all the ferrous ions had been precipitated and oxidized continuing the addition of NaOH increased the pH. The pH was allowed to rise to 9.6 in order to completely precipitate all of the cobalt ions. The resultant 60.4 lbs. of cobalt modified lepidocrocite represents a total product to seed ratio of about 2.5 to 1.

C. Preparation of Cobalt Modified Gamma Ferric Oxide

The surface of the cobalt modified lepidocrocite particles was treated by diluting the particle slurry with water from 238 gallons to 350 gallons. Then, while stirring, a surface treating agent mix of about 25 gallons of solution at 150° F. containing 1.97 lbs. of coconut oil fatty acid and .197 lbs. of morpholine was added. The treated slurry was then heated to 150° F. and stirred for 1 hour. The resulting product coated with 4% fatty acid surface treating agent (on an $Fe_2O_3$ weight basis) was filtered, washed and dried.

This material was reduced in a batch type furnace at 800° F. in the coconut oil fatty acid reducing atmosphere to cobalt modified ferroso-ferric oxide and subsequently oxidized in a current of air at 700° F. to cobalt modified gamma ferric oxide whose magnetic properties were enhanced by mechanically densifying for 70 minutes. The finished cobalt modified gamma ferric oxide tested in a 1000 Hz hysteresis loop tracer at 1900 Oe showed an Hc of 532 Oe, Br 2274 gauss, Bm 3742 gauss.

The finished product was then incorporated into magnetic tape (see Example VII).

EXAMPLE III

A. Preparation of Lepidocrocite Seed

In the same manner as described in Example I, a seed slurry was prepared from ferrous chloride and NaOH. Final seed pH was 3.8. 190 Gallons of said seed was placed in a 250 gallon tank equipped with a mechanical stirrer and an air sparger.

B. Preparation of Cobalt Modified Lepidocrocite

In order to obtain 5.92% by weight cobalt doping level (relative to iron content) 2 gallons of solution containing 9.48 lbs. of $CoCl_2.6H_2O$ was added to the completed seed. The solution was agitated and air admitted at the rate of 2.0 cfm through the sparger. NaOH (concentration 0.586 lbs/gal.) was added at 7–10 gal/hr. The tank solution was heated up to 140° F. and maintained at 135°–140° F. throughout the run. The pH was maintained at 2.8–3.4. When all the ferrous ions had been precipitated and oxidized continuing the addition of NaOH increased the pH. The pH was allowed to rise to 9.5 in order to completely precipitate all of the cobalt ions. The resultant 60.2 lbs. of cobalt doped lepidocrocite represents a total product to seed ratio of about 2.4:1.

C. Preparation of Cobalt Modified Gamma Ferric Oxide

The surface of the cobalt modified lepidocrocite particles was treated by diluting the particle slurry with water from 233 gallons to 350 gallons. Then, while stirring, a surface treating agent mix of 17 gallons of solution at 150° F. containing 1.92 lbs. of coconut oil fatty acid and 0.192 lbs. of morpholine was added. The treated slurry was then heated to 150° F. and stirred for 1 hour. The resulting product coated with 4% fatty acid surface treating agent (on an $Fe_2O_3$ weight basis) was filtered, washed and dried.

This material was reduced in a batch type furnace at 800° F. in the coconut oil fatty acid reducing atmosphere to cobalt modified ferroso-ferric oxide and subsequently oxidized in a current of air at 700° F. to cobalt modified gamma ferric oxide whose magnetic properties were enhanced by mechanically densifying for 62 minutes. The finished cobalt modified gamma ferric oxide tested in a 1000 Hz hysteresis loop tracer at 1900 Oe showed an Hc of 796 Oe, Br 2422 gauss, Bm 3493 gauss.

EXAMPLE IV

A. Preparation of Lepidocrocite Seed

To a 250 gallon tank equipped with a mechanical stirrer and a perforated pipe air sparger was added 147 gallons of water containing 63.5 lbs. of ferrous chloride and 100 ml. of conc. HCl. While vigorously stirring, over a 10 minute period, 42 gallons of solution containing 0.476 lbs/gal. of NaOH were pumped in. While still stirring air was admitted at the rate of 2 cfm. In 47 minutes the ferrous precipitate was oxidized to the ferric form. The temperature of the solution was held at 86° F. The final pH was 2.9.

B. Preparation of Cobalt Modified Lepidocrocite

In order to obtain 4.09% by weight cobalt doping level (relative to iron content) 1 gallon of solution containing 4.9 lbs. of $CoCl_2.6H_2O$ was added to the completed seed. The solution was agitated and air admitted at the rate of 2.0 cfm through the sparger. NaOH (concentration 0.471 lbs/gal) was added at 6 gal/hr. The tank solution was heated up to 140° F. and maintained at that temperature throughout the run. The pH was maintained at 2.8–3.3. When all the ferrous ions had been precipitated and oxidized continuing the addition of NaOH increased the pH. The pH was allowed to rise to 7.1. The resultant 51.5 lbs. of cobalt modified lepidocrocite represents a total product to seed ratio of about 2.1:1.

C. Preparation of Cobalt Modified Gamma Ferric Oxide

The surface of the cobalt modified lepidocrocite particles was treated by diluting the particle slurry with water from 233 gallons to 350 gallons and heating to 150° F. Then, while stirring, a surface treating agent mix of 17 gallons of solution at 150° F. containing 1.41 lbs. of coconut oil fatty acid and 0.291 lbs. of morpholine was added and stirring continued for 1 hour. The resulting product coated with 3% fatty acid surface treating agent (on an $Fe_2O_3$ weight basis) was filtered, washed and dried.

This material was reduced in a batch type furnace at 800° F. in the coconut oil fatty acid reducing atmosphere to cobalt modified ferroso-ferric oxide and subsequently oxidized in a current of air at 600° F. to cobalt modified gamma ferric oxide whose magnetic properties were enhanced by mechanically densifying for 90 minutes. The finished cobalt modified gamma ferric oxide tested in a 1000 Hz hysteresis loop tracer at 1900 Oe showed an Hc of 576 Oe, Br 2255 gauss, Bm 3661 gauss.

The finished product was then incorporated into magnetic tape (see Example VII).

EXAMPLE V

A. Preparation of Lepidocrocite Seed

To a 250 gallon tank equipped with a mechanical stirrer and a perforated pipe air sparger was added 144 gallons of water containing 65.3 lbs. of ferrous chloride and 100 ml of conc. HCl. While vigorously stirring, over a 10 minute period, 42 gallons of solution containing 0.476 lbs/gal. of NaOH were pumped in. While still stirring air was admitted at the rate of 2 cfm. In 58 minutes the ferrous precipitate was oxidized to the ferric form. The temperature of the solution was held at 84° F. The final pH was 3.5.

B. PREPARATION OF COBALT MODIFIED LEPIDOCROCITE

In order to obtain 2.86% by weight cobalt doping level (relative to iron content) 1 gallon of solution containing 3.41 lbs. of $CoCl_2.6H_2O$ was added to the completed seed. The solution was agitated and air admitted at the rate of 2.0 cfm through the sparger. NaOH (concentration 0.456 lbs/gal) was added at about 6 gal/hr. The tank solution was heated up to 140° F. and maintained at that temperature throughout the run. The pH was maintained at 2.5–3.3. When all the ferrous ions had been precipitated and oxidized continuing the addition of NaOH increased the pH. The pH was allowed to rise to 9.5 in order to completely precipitate all the cobalt ions. The resultant 48.6 lbs. of cobalt modified lepidocrocite represents a total product to seed ratio of about 2.1:1.

C. Preparation of Cobalt Modified Gamma Ferric Oxide

The surface of the cobalt modified lepidocrocite particles was treated by diluting the particle slurry with water from 233 gallons to 350 gallons and heating to 150° F. Then, while stirring, a surface treating agent mix of 17 gallons of solution at 150° F. containing 1.61 lbs. of coconut oil fatty acid and 0.322 lbs. of morpholine was added and stirring continued for 1 hour. The resulting product coated with 3.5% fatty acid surface treating agent (on an $Fe_2O_3$ weight basis) was filtered, washed and dried.

This material was reduced in a batch type furnace at 800° F. in the coconut oil fatty acid reducing atmosphere to cobalt modified ferroso-ferric oxide and subsequently oxidized in a current of air at 700° F. to cobalt modified gamma ferric oxide whose magnetic properties were enhanced by mechanically densifying for 90 minutes. The finished cobalt modified gamma ferric oxide tested in a 1000 Hz hysteresis loop tracer at 1900 Oe showed an Hc of 396 Oe, Br 2136 gauss, Bm 4000 gauss.

The finished product was then incorporated into magnetic tape (see Example VII).

EXAMPLE VI

A. Preparation of Lepidocrocite Seed

In the same manner as described in Example I, a seed slurry was prepared from ferrous chloride and NaOH. Final seed pH was 2.9. 230 gallons of said seed was placed in a 250 gallon tank equipped with a mechanical stirrer and an air sparger.

Preparation of Cobalt Modified Lepidocrocite

In order to obtain 5.92% by weight cobalt doping level (relative to iron content) 2.3 gallons of solution containing 12.10 lbs. of $CoCl_2.6H_2O$ was added to the completed seed. The solution was agitated and air admitted at the rate of 2.0 cfm through the sparger. NaOH (concentration 0.56 lbs/gal) was added at 7–10 gal/hr. The tank solution was heated up to 140° F. and maintained at 135°–145° F. throughout the run. The concentration of ferrous ion remaining in solution was monitored as a function of pH by titration. As can be seen from the FIGURE the ferrous ion concentration drops rapidly at around a pH of 3 and at a pH of 4 the ferrous ion is essentially all precipitated. The percentage of cobalt ions precipitated was also monitored as a function of pH by taking samples of the cobalt modified lepidocrocite during the reaction. These samples were dried and the cobalt content analyzed using atomic absorption spectroscopy. From the FIGURE we observe that the bulk of the cobalt ions are precipitated between a pH of 5.5 and 7.0. Thus we see that precipitating in an acid medium is not a coprecipitation process as had been suggested by Gruber et al. (U.S. Patent No. 3,075,919).

COMPARATIVE EXAMPLE A

A commercial cobalt modified $\gamma$-$Fe_2O_3$ particle manufactured by the Toda Industrial Co. Ltd. and designated UD 218 was analzyed for cobalt content using atomic absorption spectroscopy and found to contain 1.58 atomic percent cobalt. A sample of the UD 218 material was incorporated into a magnetic recording tape as described in Example VII.

COMPARATIVE EXAMPLE B

A commercial cobalt modified $\gamma$-$Fe_2O_3$ particle manufactured by the Toda Industrial Co. Ltd. and designated UD 437 was analzyed for cobalt content and was found to contain 3.53 atomic percent cobalt. A sample of the UD 437 material was incorporated into a magnetic recording tape as described in Example VII.

EXAMPLE VII

Magnetic tapes containing cobalt modified gamma ferric oxide whose preparation is described in Examples I, II, IV and V and comparative examples A and B were prepared from a laboratory vinyl copolymer formula using a 75% by weight loading of magnetic material. The mixture was ball-milled for 48 hours yielding a product having a viscosity of approximately 85 krebs units. The formulation is then applied in accordance with known practice to a polyethylene terephthalate base in the form of a 3 inch strip. While the applied coating is still wet, it is run through a magnetic field to orient the particles in known manner after which the strip is dried and may be calendered, compressed or burnished and finally it is slit and put on rolls or reels under tension, the normal coating thicknesses being from about 0.10 to 0.60 mil, and in this specific instance, being about 0.40 mil.

The magnetic stability coefficient was measured on the recording tapes containing cobalt modified $\gamma$-$Fe_2O_3$ using a vibrating sample magnetometer. The samples measured were ¼ inch discs. A disc was saturated in the oriented direction after its coercive force (Hc) had been measured in that direction with a magnetizing field of 5 kOe and the saturation magnetization (Bm) noted. The field was decreased to 0 Oe and the saturation remanence (Br) measured. The disc was heated to 150° C. and maintained at that temperature for 30 minutes in an oven. The magnetic field in the oven was the same as the earth's field. After the disc was removed and had cooled down to room temperature, the remaining remanence was measured in the oriented direction. The measurement procedure was repeated for a disc magnetized orthogonal to the direction of orientation. From these measurements the magnetic stability coefficient was calculated.

It was difficult to obtain good repeatability of this coefficient, even though the basic measurements were repeated within 1%, because it is composed of the quotient of two sets of differences. If these differences are small this can result in a considerable variation in magnetic stability coefficient. There now follows a table of values of this coefficient (Table I).

TABLE I

MAGNETIC STABILITY CHARACTERISTICS OF EXAMPLES

| EXAMPLE | Hc(Oc) | $\dfrac{Br_{\parallel}}{Br_{\perp}}$ | $\dfrac{Br_{\parallel}^{150°C.}}{Br_{\parallel}^{R.T.}} \times 100\%$ | $\dfrac{Br_{\perp} - Br_{\perp}^{150°C.}}{Br_{\parallel} - {}_{\parallel}^{150°C.}}$ | MAGNETIC STABILITY COEFFICIENT |
|---|---|---|---|---|---|
| 1 | 440 | 1.89 | 96.2 | 6.15 | 9680 |
| 2 | 505 | 1.35 | 92.4 | 4.77 | 4390 |
| 3 | 858 | 1.22 | 88.8 | 3.22 | 4110 |
| COMPARATIVE EXAMPLE | | | | | |
| A | 423 | 1.60 | 89.0 | 1.09 | 780 |
| D | 650 | 1.16 | 71.3 | 1.22 | 1060 |

The superior magnetic stability coefficient of Examples 1-3 results from a high orientation ratio, very low loss in the oriented direction and high loss in the transverse direction.

Using a magnetic tape testing machine (Ampex 300) running at 7.5 i.p.s. and all necessary auxiliary equipment for evaluating tapes, the cobalt modified synthetic gamma ferric oxide of the invention was incorporated into a magnetic tape according to standard procedures previously described and compared with tapes similarly made having cobalt modified magnetic gamma ferric oxides prepared according to prior art methods. In order to provide a standard of comparison so that the tested tapes are intercomparable, the tape transport is adjusted to give a frequency response of 0 db output at all frequencies encompassing the audio range (about 100 to 15,000 Hertz), using a generally good audio tape readily available commercially (for example Minnesota Mining and Manufacturing Co. III-A or others).

The recording data is tabulated in Table II.

considerably improved. We would expect these surface improvements produced by the more easily dispersed cobalt modified iron oxide of the invention to show improved recording characteristics when utilized in video recording tapes.

What is claimed is:

1. Synthetic cobalt modified acicular gamma ferric oxide wherein the cobalt is present in an amount of at least about ¼ atomic percent cobalt, based on the iron content, which when incorporated with vinyl copolymer recording binder at a level of 75% by weight provides a polyethylene terephthalate based magnetic recording member which exhibits a magnetic stability coefficient of from about 4,000 to about 10,000.

2. The product of claim 1 wherein the atomic percent cobalt is about 2 to 5, based on the iron content.

3. A process for the manufacture of synthetic acicular gamma ferric oxide containing at least about ¼ atomic percent cobalt, based on the iron content, which when incorporated with recording binder at a level of 75% by

TABLE II

COMPARISON OF RECORDING DATA

| MAGNETIC OXIDE | Ex. 1 | Ex. 2 | Ex. 4 | Ex. 5 | COMPARATIVE EX. A | COMPARATIVE EX. B |
|---|---|---|---|---|---|---|
| ATOMIC % CO (analyzed) | 3.29 | 4.11 | 3.09 | 2.13 | 1.58 | 3.53 |
| COATING THICKNESS (MICRO INCHES) | 400 | 400 | 400 | 400 | 400 | 400 |
| PEAK BIAS (mA) | 9.14 | 10.36 | 10.63 | 7.46 | 8.43 | 11.95 |
| SENSITLITY | | | | | | |
| at 100 Hz (dB) | −0.8 | −1.2 | −2.1 | 0.4 | −4.8 | −8.9 |
| at 1 kHz (dB) | −0.2 | −0.9 | −1.4 | 0.9 | −4.1 | −7.9 |
| at 7.5 kHz (dB) | 1.8 | 0.1 | 1.1 | 3.2 | −1.8 | −6.7 |
| at 10 kHz (dB) | 2.4 | 0.2 | 1.5 | 4.1 | −1.0 | −6.4 |
| at 15 kHz (dB) | 4.6 | 1.9 | 3.4 | 6.8 | 1.3 | −4.5 |
| OUTPUT AT 3% Total HD (dB) | 9.2 | 9.2 | 8.8 | 10.6 | 5.3 | 3.8 |
| SATURATED OUTPUT 500 Hz (dB) | 17.0 | 17.4 | 16.2 | 17.4 | 12.6 | 12.3 |
| SATURATED OUTPUT 15 kHz (dB) | 1.4 | 0.2 | 0.2 | 1.9 | −1.4 | −4.1 |
| BIAS NOISE (1-5 kHz) (dB) | −71.3 | −70.8 | −71.7 | −70.7 | −72.9 | −75.2 |
| D. C. NOISE (1-5 kHz) (dB) | −61.9 | −60.6 | −62.8 | −64.1 | −63.8 | −67.2 |
| DYNAMIC RANGE (dB) | 71.1 | 69.9 | 70.3 | 71.0 | 68.8 | 67.3 |
| SIGNAL/NOISE (dB) | 80.5 | 80.0 | 80.5 | 80.7 | 78.2 | 71.0 |
| MAX. FIELD 5 kCe | | | | | | |
| POWDER Hc (Oe) | 397 | 482 | 515 | 360 | 452 | 645 |
| TAPE Hc (Oe) | 440 | 505 | 543 | 377 | 423 | 650 |
| Br (gause) | 1340 | 1370 | 1170 | 1330 | 830 | 860 |
| Bm (gause) | 1570 | 1660 | 1380 | 1560 | 1130 | 1060 |
| Squareness Ratio | 0.850 | 0.824 | 0.849 | 0.850 | 0.739 | 0.812 |

Even when incorporated in the same formulation, the examples prepared according to the art described here all have considerably improved recording properties over comparative examples A and B. The long and short wavelength sensitivity and saturated outputs are improved due to higher Br and a smoother surface produced by the effect of the coconut oil fatty acid. Because more particles are packed into the tapes of Examples 1, 2 4 and 5, the signal to noise ration is also weight provides a magnetic recording member which exhibits a magnetic stability coefficient of from about 4000 to about 10,000 comprising the steps of:

(a) introducing aqueous alkali into aqueous ferrous chloride containing from about 0.25 to 0.7 pound ferrous chloride per gallon, said alkali being added at the rate of from about 0.03 to 0.2 equivalents per minute per mole dissolved ferrous chloride while maintaining the temperature at about 60°–90° F.; continuing said addition until sufficient alkali has been added to precipitate from about 20 to 85% of the iron as ferrous hydroxide;

(b) introducing oxygen-containing gas into said aqueous mixture until the pH is between about 2.6 and 4.1 and the ferrous hydroxide precipitate is oxidized to the lepidocrocite form;

(c) adding water-soluble cobalt salt to the resulting lepidocrocite seed slurry in an amount equivalent to at least about 0.25 atomic percent cobalt based on the total iron introduced;

(d) maintaining said slurry at about 80°–160° F. and a pH between about 2.6 and 4.1 while simultaneously and continuously introducing alkali and oxygen-containing gas until the iron content is substantially completely precipitated in the form of lepidocrocite;

(e) and adding aqueous alkali while introducing oxygen-containing gas into said aqueous mixture at about 80°–160° F. to a pH between about 7 and 9.5 until substantially all of the cobalt ion has precipitated on the surface of said lepidocrocite;

(f) reducing in a reducing atmosphere said cobalt modified lepidocrocite to cobalt modified ferrosoferric oxide at a temperature of from about 650° to 800° F., and subsequently oxidizing in an oxidizing atmosphere to cobalt modified acicular gamma ferric oxide.

4. The process of claim 3 wherein the cobalt modified lepidocrocite produced in step "e" is coated with at least one hydrophobic aliphatic monocarboxylic acid having from about 8 to about 24 carbon atoms prior to the reduction and oxidation of step "f".

5. The process of claim 3 wherein the final product is mechanically densified.

6. The process of claim 3 wherein said alkali is selected from sodium hydroxide, potassium hydroxide, or calcium hydroxide.

7. The process of claim 2 wherein said cobalt salt is added in an amount equivalent to from about 2 to 5 atomic percent cobalt based on the total iron introduced.

8. The process of claim 3 wherein said oxidation in step f) is performed in a current of air.

* * * * *